US010938751B2

(12) United States Patent
McDonald et al.

(10) Patent No.: US 10,938,751 B2
(45) Date of Patent: Mar. 2, 2021

(54) HIERARCHICAL SWITCHING DEVICES (71) Applicant: HEWLETT PACKARD ENTERPRISE DEVELOPMENT LP, Houston, TX (US)

(72) Inventors: Nicholas George McDonald, Fort Collins, CO (US); Darel N Emmot, Wellington, CO (US)

(73) Assignee: Hewlett Packard Enterprise Development LP, Houston, TX (US)

(*) Notice: Subject to any disclaimer, the term of this patent is extended or adjusted under 35 U.S.C. 154(b) by 89 days.

(21) Appl. No.: 15/956,206

(22) Filed: Apr. 18, 2018

(65) Prior Publication Data
US 2019/0327189 A1 Oct. 24, 2019

(51) Int. Cl.
H04L 12/861 (2013.01)
H04L 12/933 (2013.01)
(Continued)

(52) U.S. Cl.
CPC .......... *H04L 49/90* (2013.01); *H04L 45/10* (2013.01); *H04L 49/101* (2013.01); *H04L 49/15* (2013.01);
(Continued)

(58) Field of Classification Search
None
See application file for complete search history.

(56) References Cited

U.S. PATENT DOCUMENTS 5,214,640 A * 5/1993 Sakurai ................ H04L 49/103
370/355
6,324,613 B1 11/2001 Aguilar et al.
(Continued)

FOREIGN PATENT DOCUMENTS

EP 0206512 A2 12/1986
EP 0849917 B1 7/2005
JP 2817770 B2 10/1998

OTHER PUBLICATIONS

Koka, P. et al., "Silicon-Photonic Network Architectures for Scalable, Power-Efficient Multi-Chip Systems," (Research Paper), Jun. 19-23, 2010, pp. 117-128, http://dl.acm.org/citation.cfm?id=1815977.
International Search Report and Written Opinion received for PCT Patent Application No. PCT/US2019/028122, dated Aug. 7, 2019, 11 pages.
International Search Report and Written Opinion received for PCT Application No. PCT/US2019/059160, dated Mar. 27, 2020, 09 pages.

*Primary Examiner* — Saba Tsegaye
(74) *Attorney, Agent, or Firm* — Park, Vaughan, Fleming & Dowler LLP (57) ABSTRACT

Examples relate to hierarchical switching devices comprising a plurality of sub-switches forming a fully interconnected all-to-all network. The sub-switches comprise internal input ports and internal output ports to exchange packets with other sub-switches within the fully interconnected all-to-all network. The internal input ports of the sub-switches have exclusive access to a queue partition for each external output port of the respective sub-switch. A switch controller receives a packet at a first sub-switch of the plurality of sub-switches that is to be routed to a particular external output port of a second sub-switch of the plurality of sub-switches. The switch controller routes the packet directly from the first sub-switch to the second sub-switch using an internal output port of the first sub-switch and a queue partition of the second sub-switch that is for the particular external output port of the second sub-switch.

20 Claims, 4 Drawing Sheets

(51) Int. Cl.
*H04L 12/947* (2013.01)
*H04L 12/751* (2013.01)

(52) U.S. Cl.
CPC ... *H04L 49/25* (2013.01); *H04Q 2213/13342* (2013.01)

(56) References Cited

U.S. PATENT DOCUMENTS

| | | |
|---|---|---|
| 8,352,669 B2 | 1/2013 | Wu et al. |
| 9,100,323 B1 | 8/2015 | Sindhu et al. |
| 9,693,124 B2 | 6/2017 | Robinson et al. |
| 9,699,078 B1 | 7/2017 | Chen et al. |
| 2006/0126610 A1 | 6/2006 | Ryan et al. |
| 2006/0171381 A1 | 8/2006 | Benner et al. |
| 2006/0285548 A1* | 12/2006 | Hill ................... H04L 12/5601 370/416 |
| 2007/0145828 A1 | 6/2007 | Taylor et al. |
| 2008/0279195 A1 | 11/2008 | Okuno |
| 2011/0167158 A1 | 7/2011 | Lehr et al. |
| 2011/0310739 A1* | 12/2011 | Aybay ................... H04L 47/10 370/235 |
| 2012/0134359 A1 | 5/2012 | Nakagawa |
| 2012/0140626 A1* | 6/2012 | Anand ................... H04L 47/26 370/235 |
| 2017/0214579 A1 | 7/2017 | Chen et al. |

* cited by examiner

HIERARCHICAL SWITCHING DEVICES

BACKGROUND

Network switching devices can be implemented as interconnected sub-networks that connect the input and output ports of these network switching devices. For example, a network switching device, e.g., a router or a switch, may be implemented as a monolithic crossbar which exhibits no port-to-port dependencies. Having network switching devices that exhibit no port-to-port dependencies may assure deadlock freedom in the network. Port-to-port dependencies may determine the success of a packet desiring to exit the network switching device on a particular port that is not permanently dependent on the success of another packet exiting a different port of the same network switching device. Routing algorithms may avoid port-to-port dependencies in order to ensure deadlock freedom in the network switching device and thus, in the network to which the network switching device is connected. The size of a monolithic crossbar grows with a polynomial factor. A network switching device may be implemented as a hierarchical switching device to reduce the size needed for implementation. Careful design practices should be followed to ensure that a hierarchical switching device does not create port-to-port dependencies that may cause deadlock.

DETAILED DESCRIPTION

Examples disclosed herein describe hierarchical switching devices comprising a plurality of output queued sub-switches connected to each other forming a fully interconnected all-to-all network. Each one of the sub-switches of the switching device may comprise internal input ports and internal output ports to exchange packets with other output queued sub-switches within the fully interconnected all-to-all network. The internal input ports of the sub-switches may have exclusive access to a queue partition for each external output port of the respective sub-switch. For example, in virtual output queuing techniques the physical buffer of each input port of a network device may maintain a separate virtual output queue for each output port of the network device. Each one of these virtual output queues may correspond to a queue partition of the physical buffer of the port. As used herein, a fully interconnected all-to-all network may be a network in which all nodes are connected to each other. For example, the fully interconnected all-to-all network may be a one-dimensional HyperX network or a one-dimensional flattened butterfly network.

As used herein, a switching device may refer to devices that determine the route or direction a data packet is to take in a network. Examples of switching devices may be routers or switches. A hierarchical switching device may refer to switching devices formed by a plurality of interconnected sub-switches.

As used herein, a sub-switch may refer to switching devices that participate with other switching devices within a logical composite arrangement such that the plurality of sub-switches behaves as a single switching device.

The hierarchical switching device may also comprise a switch controller to receive a packet at a first sub-switch of the plurality of output queued sub-switches, for example at an external input port of the first sub-switch. The external input port may be a port to receive packets from devices external to the switching device. The received packet may be to be routed to a second sub-switch of the plurality of sub-switches, for example to a particular external output port of the second sub-switch. The external output port may be a port to send packets to other devices external to the switching devices. The switch controller, in response to receipt of the packet, may route the packet directly from the first sub-switch to the second sub-switch using an internal output port of the first sub-switch and a queue partition of the second sub-switch that is for the particular external output port of the second sub-switch to which the packet is to be routed. Therefore, the queue partition of the second sub-switch, to which the internal input port of the second sub-switch that has received the packet and thus, the first sub-switch, has access, is the queue partition dedicated to the particular external output port of the second sub-switch to which the packet is to be routed in its path towards its destination.

In some examples, the packet may be directly routed between the first sub-switch and the second sub-switch via a minimal path. As used herein, the minimal or direct path may refer to the path in the fully interconnected network that directly interconnects the first sub-switch and the second sub-switch. Thus, routing a packet through a minimal path avoids the packet passing through any intermediate sub-switch.

This hierarchical switching device, with the plurality of sub-switches forming the fully interconnected all-to-all network and with the disjoint input and output ports of the plurality of sub-switches avoiding exhibiting any sustainable dependency upon one another, may create an inner hierarchical switch architecture that can break all port-to-port dependencies internally such that the composite design can behave as a single switching device. Therefore, this inner hierarchical switch architecture may be deadlock-free.

In some examples, a particular queue partition of an internal input port and for a particular external output port of a particular sub-switch may have independent packet flow relative to other queue partitions for different external output ports of the particular sub-switch in the same internal input port. In this way, each queue partition in which the internal input port is divided may be scheduled by itself, so in the event one of the queue partitions for a particular external output port blocks, the rest of queue partitions in the internal input port that may be for the rest of output ports of the same sub-switch can keep flowing. Therefore, the lack of dependencies for the queue partitions corresponding to different external output ports may avoid deadlock blocks.

In some other examples, the external input ports of the sub-switches may also have exclusive access to a queue partition for each internal output port of the sub-switch. This may significantly reduce head-of-line blocking at the ingress of the packet in the switching device.

In some examples, the queue partitions for the external output ports to which the internal input ports have access, including queue partitions associated to internal and external input ports, may be virtual output queues at the sub-switch input ports. In such examples, the packets received at a particular sub-switch are directly distributed among the virtual output queues for the corresponding sub-switch output ports. In some other examples, the queue partitions for the external output ports to which the internal input ports have access, including queue partitions associated to internal and external input ports, may be virtual queues associated to nodes of a fully buffered crossbar fabric of the respective sub-switches. In such examples, each sub-switch implements a fully buffered crossbar in which packets received in a particular sub-switch are distributed among the queues for the sub-switch output ports that are associated to the buffers of the nodes of the fully buffered crossbar fabric.

In some other examples, the switch controller may monitor a state of the queue partitions of the internal input ports and arbitrate which packet from any of the queue partitions is to be routed between the first sub-switch and the second sub-switch based on the state of the queue partitions. Thus, the switch controller may decide which packets of a plurality of queue partitions of the first sub-switch are eligible to be routed towards the second sub-switch based on the state of said queue partitions. For example, the switch controller may prioritize routing packets from queue partitions which store a number of packets below a pre-defined threshold.

In some other examples, each sub-switch of the plurality of sub-switches comprises a packet scheduler to distribute the packets received in a particular sub-switch input port among the plurality of queue partitions to which the sub-switch input port has exclusive access.

In some examples, the switch controller may be located within the hierarchical switching device and may receive and route all the packets received at the switching device. However, in some other examples, each sub-switch of the plurality of sub-switches may comprise a respective switch controller that is to receive and route packets received at the corresponding sub-switch.

As used herein, a queue partition may refer to a portion of the physical buffer associated to the corresponding port that may be dynamically or statically assigned by the switch controller. For example, the switch controller may store dynamic pointers to the different queue partitions of the buffers of each input port of the switching device that may change during operation. In some other examples, the switch controller may store static pointers to the different queue partitions or may store a combination of static pointers to particular queue partitions and dynamic pointers to other queue partitions within the same buffer of a particular input port.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
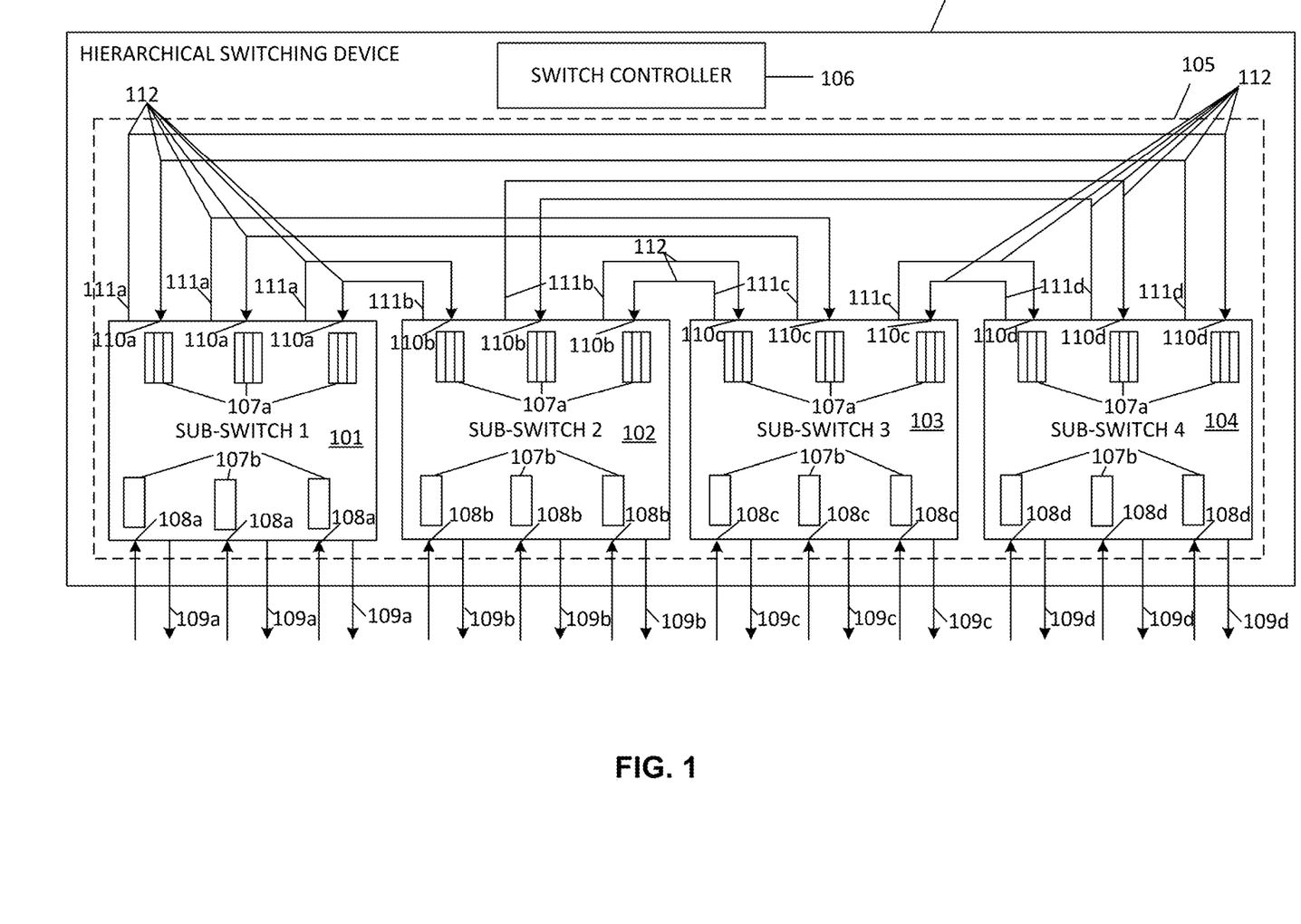
FIG. 1 is a block diagram of an example hierarchical switching device with a plurality of sub-switches connected to each other forming a fully interconnected all-to-all network.

Turning now to the figures, FIG. 1 shows a block diagram of an example hierarchical switching device 100 with a plurality of sub-switches 101-104 connected to each other forming a fully interconnected all-to-all network 105. While FIG. 1 shows a hierarchical switching device 100 comprising four fully interconnected sub-switches, the hierarchical switching device 100 may comprise any number of fully interconnected sub-switches.

The hierarchical switching device 100 has twelve external input ports 108 to receive packets from other external devices to which the switching device 100 may be connected and twelve external output ports 109 to send packets to these external devices. More particularly, sub-switch1 101 is connected to external input ports 108a and to external output ports 109a, sub-switch2 102 is connected to external input ports 108b and to external output ports 109b, sub-switch 103 is connected to external input ports 108c and to external output ports 109c and sub-switch4 104 is connected to external input ports 108d and to external output ports 109d.

Moreover, sub-switch1 101 has three internal input ports 110a to receive packets from the rest of sub-switches 102-104 forming the all-to-all network 105 and three internal output ports 111a to send packets to the rest of sub-switches 102-104. In turn, sub-switch2 102 has three internal input ports 110b and three internal output ports 111b, sub-switch3 103 has three internal input ports 110c and three internal output ports 111c and sub-switch4 104 has three internal input ports 110d and three internal output ports 111d. While FIG. 1 shows all sub-switches 101-104 having three external input ports and three external output ports, the sub-switches may have any number of external input and output ports. In some examples, the sub-switches may have a different number of input ports and output ports or may have a different number of ports between them. In some other examples, some of the sub-switches may not have external output or input ports so these sub-switches may act as a forwarding sub-switch within the all-to-all network.

Each external input port 108 of the sub-switches 101-104 has exclusive access to a queue 107b. These queues may be any queue such as circular queues, priority queues, etc. In addition, each of the internal input ports 110 of the sub-switches 101-104 has exclusive access to a virtual output queue 107a for each external output port 109 of the respective sub-switch 101-104. In particular, the three internal input ports 110a of sub-switch1 101 have access to three virtual output queues 107a, each virtual output queues corresponding to each of the external output ports 109a. The three internal input ports 110b of sub-switch2 102 have access to three virtual output queues 107a, each virtual output queues corresponding to each of the external output ports 109b. The three internal input ports 110c of sub-switch3 103 have access to three virtual output queues 107a, each virtual output queues corresponding to each of the external output ports 109c. The three internal input ports 110d of sub-switch4 104 have access to three virtual output queues 107a, each virtual output queues corresponding to each of the external output ports 109d.

With these internal input ports 110 having access to the virtual output queues 107, when a packet arrives to any of the internal input ports 110 it is placed in the virtual output queue 107 associated to the external output port 109 that the packets is to be routed towards its destination. Therefore, packets destined to different external output ports are in separate virtual output queues 107 until they are processed. In some other examples, the virtual output queues 107 at the internal input ports 110 may be replaced with a fully buffered crossbar fabric in which there are output queues associated to the nodes of the buffered crossbar that are for the output ports of the corresponding sub-switch. Therefore, when a packet arrives to any of the input ports of a sub-switch, said packet may be placed in the output queue associated to the output port through which the packets is to be routed towards its destination. Therefore, packets destined to different output ports are in separate output queues of the fully buffered crossbar fabric until they are processed.

In some other examples, the external input ports 108a-d of the sub-switches 101-104 may have exclusive access to a virtual output queue for the internal output ports 111a-d of the respective sub-switch 101-104. This may avoid packet collisions at the ingress of the hierarchical switching device 100 and thus, head-of-line blocking may be reduced.

The hierarchical switching device 100 receives packets via any of its external input ports 108. The packet may comprise a header specifying its destination so that the switch controller 106 can determine the external output port 109 of the switching device 100 for the packet to be routed towards its destination. The external input port 108 through which the packet is received and the external output port 109 through which the packet is to be sent towards its destination may belong to different sub-switches 101-104. Thus, the switch controller 106 determines a minimal route within the fully interconnected all-to-all network 105 and routes the packet directly from the sending (source) sub-switch to the receiving (destination) sub-switch through the minimal route and using an internal output port 111 of the sending sub-switch and the queue partition of the receiving sub-switch that is for the external output port 109 of the receiving sub-switch to which the packet is to be routed. This queue partition that is used for routing the packet is the queue partition dedicated to the particular external output port 109 previously determined by the switch controller 106.

The sub-switches 101-104 are connected to each other by inter-sub-switch links 112. These inter-sub-switch links 112 may be electrical links, optical links or a combination of electrical and optical links.

In some examples the hierarchical switching device 100 may be a multi-die switch where at least one sub-switch is located on a particular die. For example, each die may comprise one, two or a different number of sub-switches wherein sub-switches within a common die and sub-switches in different dies of a multi-die switch are all interconnected forming an all-to-all network.

Figure 2:
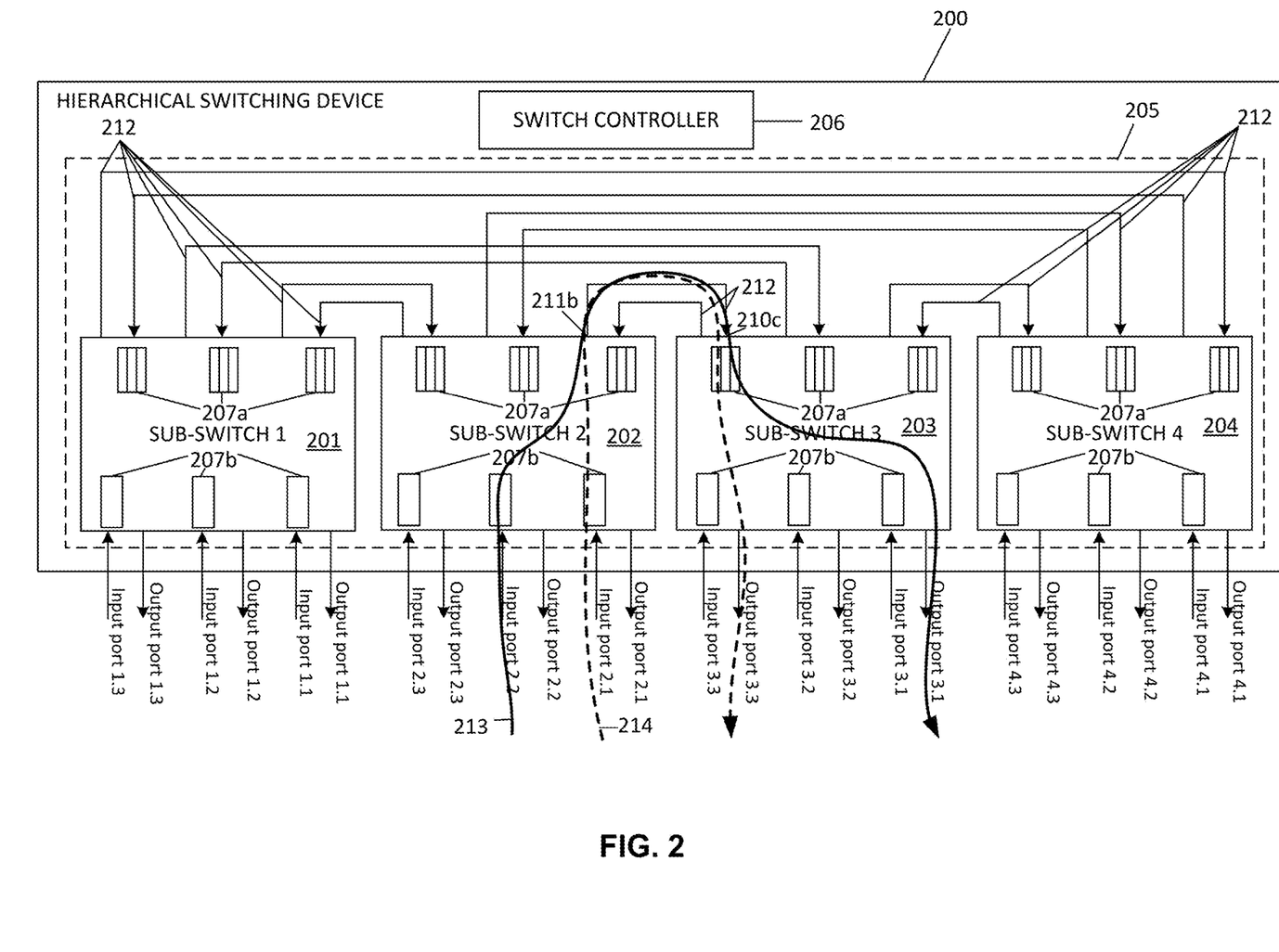
FIG. 2 is a block diagram of the example hierarchical switching device of FIG. 1 with packets being routed from an external input port of a first sub-switch to an external output port of a second sub-switch.

FIG. 2 is a block diagram of the example hierarchical switching device 200 of FIG. 1 with packets being routed from an external input port of a first sub-switch to an external output port of a second sub-switch.

The switching device 200 receives a first packet 213 via a first external input port, in particular via external input port 2.2 that is connected to sub-switch2 202 of the plurality of fully interconnected sub-switches 201-204. The first packet 213 is stored in the queue 207b of the external input port 2.2 until it is processed. Then, the switching device 200 receives a second packet 214 via a second external input port, in particular external input port 2.1, that is connected to the same sub-switch2 202 of the plurality of fully interconnected sub-switches 201-204. The second packet 214 is stored in the queue 207b of the external input port 2.2 until it is processed. The queues 207b may be any kind of queue such as circular queues, priority queues, etc. While in the example of FIG. 2 packets 213, 214 are received at the same ingress sub-switch, packets may be received at different sub-switches and may be routed via a common or a different egress sub-switch.

The switch controller 206 reads the header of the first packet 213 to know its destination. Based on this destination, the switch controller 206, that for example may store the structure and topology of the network (not shown in this figure) to which the hierarchical switching device 200 is connected, determines that the first packet 213 is to egress the hierarchical switching device 200 through the external output port 3.1 in its path towards its destination. The external output port 3.1 is connected to the sub-switch3 203 of the fully interconnected all-to-all network 205. In turn, the switch controller 206 reads the header of the second packet 214 to know its destination. Based on this destination, the switch controller 206 determines that the second packet 214 is to egress the hierarchical switching device 200 through external output port 3.3 in its path towards its destination. The external output port 3.3 is also connected to the sub-switch3 203.

Thus, the switch controller 206 calculates all the possible candidate routes between sub-switch2 202 and sub-switch3 203. Then, the switching device 206 routes both packets 213,214 using a minimal route between sub-switch2 202 and subswitch3 203. This minimal route corresponds to the inter-sub-switch link 212 that interconnects the internal output port 211b of sub-switch2 202 and the internal input port 210c of subswitch3 203. The internal input port 210c of sub-switch3 203 has access to three virtual output queues 207a wherein each virtual output queue 207a is for a respective external output port, in particular to output ports 3.1, 3.2 and 3.3, of sub-switch3 203. Thus, once the packets 213,214 are routed from the queues 207b of external input port 2.1 and external input port 2.2 respectively, via the internal output port 211b of subswitch2 202 to the internal input port 210c of sub-switch3 203, the first packet 213 is stored in the virtual output queue 207a of the internal input port 210c for the external output port 3.1 until it is processed. Similarly, the second packet 214 is stored in the virtual output queue 207a of the internal input port 210c for the external output port 3.2 until it is processed. Routing the packets through a minimal or direct route avoids port-to-port dependencies that may appear when using non-minimal routes. Non-minimal or indirect routes may cause packets sourced from different inputs ports destined to different output ports to contend for the same intermediate queues. This contention may cause port-to-port dependencies.

Then, the packets 213,214 are simultaneously and independently routed from the virtual output queues 207a to their external output ports, external output port 3.1 and external output port 3.3 respectively, in sub-switch3 203 towards their corresponding destinations. The independent packet flow of the virtual output queues to which the same input port has access avoids packet collision at the ingress of the internal input port 210c and ensures deadlock freedom. The routes calculated for packets 213 and 214 can be calculated independently to each other by the switch controller 206. For example, a first disaggregated portion of the switch controller 206 calculates the route for packet 213 and routes it towards its external output port, while a second disaggregated portion of the switch controller 206 calculates the route for packet 214 and routes it towards its corresponding external output port. Another disaggregated portion of the switch controller 206 may arbitrate between packets 213 and 214 determining the order said packets 213,214 at internal output port 211b advance over inter-sub-switch links 212 towards the corresponding and common virtual output queue 207a.

In some other examples, the external input ports, in particular external input ports 1.1-3, 2.1-3, 3.1-3 and 4.1-3, of the sub-switches 201-204 may have exclusive access to a virtual output queue for internal output port 111a-d the respective sub-switch 201-204. Thus, when more than one packet is simultaneously received at a particular external input port of a particular sub-switch, these packets to be routed via different internal output ports of the particular sub-switch, the allocation of one virtual output queue for each of these internal output ports avoids packet collisions at the ingress of the switching device 200 and head-of-line blocking may be reduced.

While in the example of FIG. 2 all the sub-switches 201-204 comprise external input ports and external output ports, in some examples, there may be sub-switches within the all-to-all network lacking external input ports, so these sub-switches can only send packets to other switching devices in the same or a different network. In some other examples, there may be sub-switches within the all-to-all network lacking external output ports, so these sub-switches can only receive packets from other switching devices in the same or a different network. In some other examples, there may be sub-switches within the all-to-all network without external or internal output ports, so these sub-switches can only forward packets to other sub-switches within the same fully interconnected all-to-all network.

Figure 3:
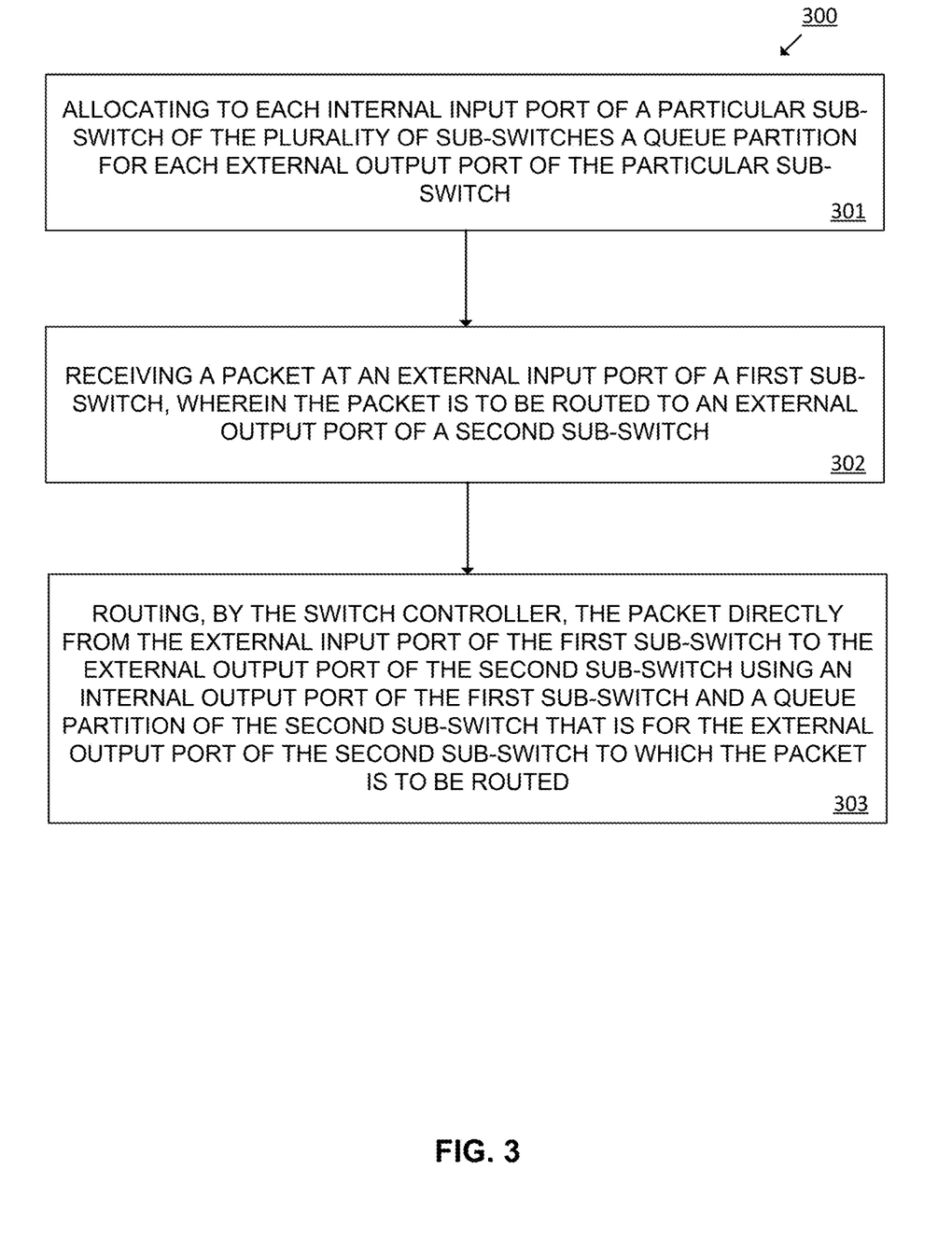
FIG. 3 is a flowchart of an example method for routing packets using hierarchical switching devices with a plurality of sub-switches connected to each other forming a fully interconnected all-to-all network.

FIG. 3 is a flowchart of an example method 300 for routing packets using hierarchical switching devices configured as an all-to-all topology. The hierarchical switching devices comprise a plurality of output queued sub-switches forming a fully interconnected all-to-all network. Each one of the sub-switches comprise internal input ports and internal output ports to exchange packets with other sub-switches within the fully interconnected all-to-all network. For example, the fully interconnected all-to-all network may be a one-dimensional HyperX network or a one-dimensional flattened butterfly network.

At step 301 of the method 300, each internal input port of a particular sub-switch of the plurality of sub-switches forming the fully interconnected all-to-all network is allocated with a queue partition for each external output port of the respective sub-switch. Therefore, the method 300 allocates to each internal input port of a particular sub-switch as many queue partitions as external output ports the particular sub-switch has. In some examples, each external input port of a particular sub-switch may be allocated with a queue partition for each internal output port of the respective sub-switch. Thus, the method 300 may allocates to each external input port of a particular sub-switch as many queue partitions as internal output ports the particular sub-switch has.

At step 302 of the method 300, a packet is received at an external input port of a first sub-switch of the plurality of sub-switches. The received packet is to be internally routed to an external output port of a second sub-switch of the plurality of sub-switches. This external output port may interconnect the current switching device with another switching device or any other device within the same network in which the current switching device is connected or to any network external to the current switching device.

At step 303 of the method 300, a switch controller of the hierarchical switching device routes the packet between the external input port of the first sub-switch to the external output port of the second sub-switch using an internal output port of the first sub-switch and a queue partition of the second sub-switch that is for the external output port of the second sub-switch to which the packet is to be routed. This queue partition is the queue partition previously allocated for the external output port of the second sub-switch through which the packet is to be routed. In some examples, for a particular internal input port of a particular sub-switch, the method may implement the different queue partitions for the different external output ports of the particular internal input port having an independent packet flow relative to each other. Thus, packet flow in each of the queue partition is independent from each other.

In some examples, the switch controller may determine the minimal or direct route for the packet by, for example, using a pre-existing routing table stored in the switching device that stores the inner topology of the hierarchical switching device or by performing arithmetic operations, for example using fixed function logic in the switching device. This routing table may also store the topology of the network to which the switching device is connected so the switch controller is able to identify the external output port a packet is to take in order to be routed to its destination. This routing table may be periodically updated by a network controller communicatively connected to the switching device. This network controller may also provide the topology of the network to which the switching device is connected. In some other examples, there may be a first routing table storing the inner topology of the hierarchical switching device and a second routing table storing the topology of the network to which the switching device is connected. For example, the switch controller can firstly determine the external output port of the switching device through which the packet is to be routed by checking the second routing table. Then, having knowledge of the external input port through which the packet has been received and the external output port to which the packet is to be routed, the switch controller can determine the minimal route through the inner all-to-all network of the switching device checking the first table.

In some examples, the method 300 may select the queue partitions for the output ports to which the input ports have access, including the queue partitions to which the external and the internal input ports have access, from a group comprising virtual output queues at the input ports of the respective sub-switches and output queues associated to nodes of a fully buffered crossbar of the respective sub-switches.

In some other examples, the switch controller may monitor a state of the queue partitions to which the internal input ports of the sub-switches have access. Then, the switch controller may arbitrate which packet from which of the queue partitions is to be routed between the first sub-switch and the second sub-switch based on the state of the queue partitions.

In some examples, a packet scheduler of the switching device may distribute the packets received in a particular input port of a particular sub-switch among the queue partitions to which the input ports of the particular sub-switch have access.

Figure 4:
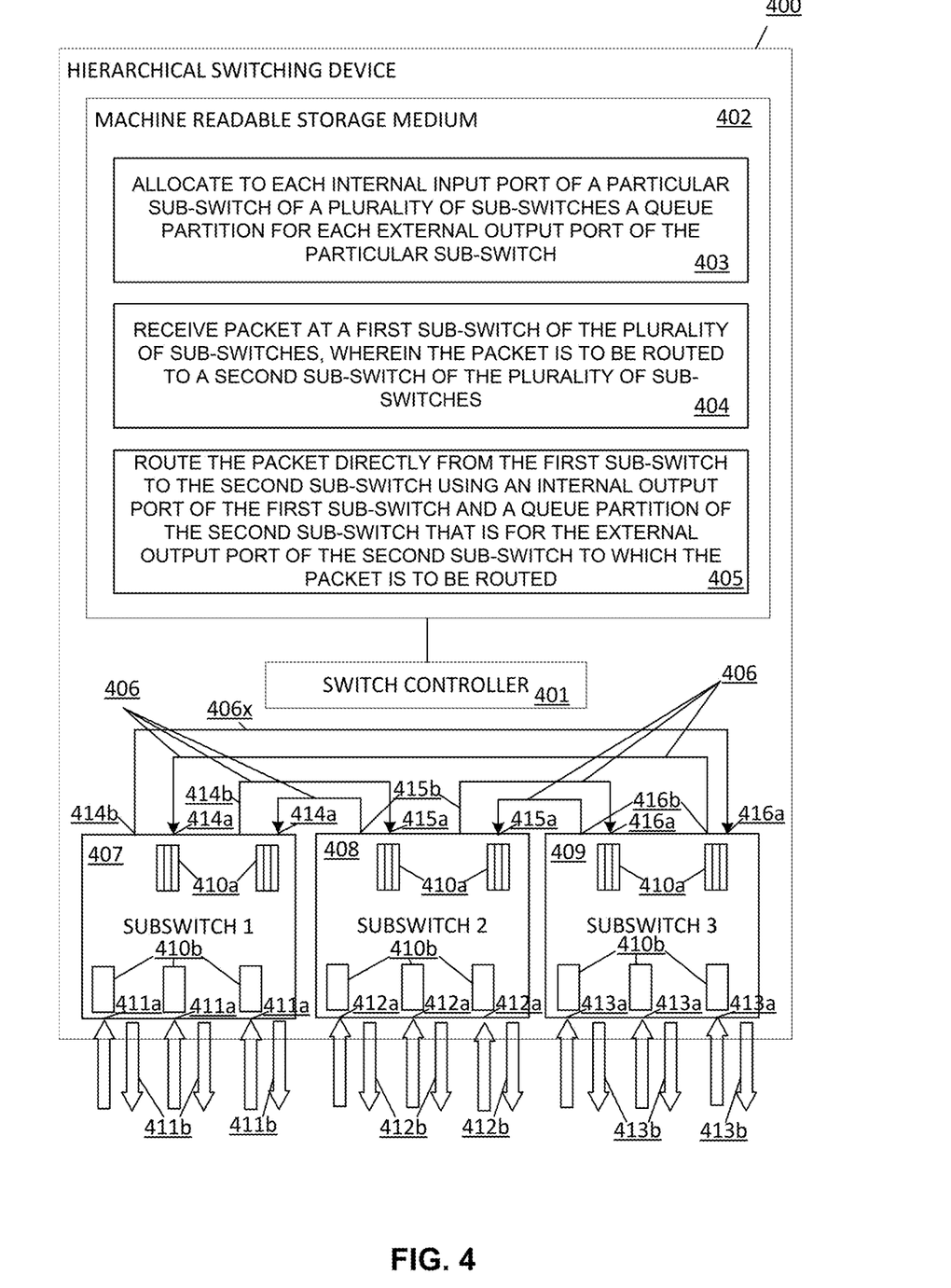
FIG. 4 is a block diagram of an example hierarchical switching device with a plurality of sub-switches connected to each other forming a fully interconnected all-to-all network and including a machine-readable storage medium that stores instructions to be executed by a switch controller of the hierarchical switching device.

FIG. 4 is a block diagram of an example hierarchical switching device 400 with a plurality of output queued sub-switches 407-409 connected to each other forming a fully interconnected all-to-all network and including a machine-readable storage medium 402 that stores instructions to be executed by a switch controller 401 of the hierarchical switching device 400. It should be understood that the hierarchical switching device 400 depicted in FIG. 4 may include additional components and that some of the components described herein may be removed and/or modified without departing from a scope of the example hierarchical switching device 400. Additionally, implementation of hierarchical switching device 400 is not limited to such example. It should also be understood that switch controller 401 may represent a combination of hardware and software logic in hierarchical switching device 400 for routing packets from a first sub-switch 407-409 to a second sub-switch 407-409.

The hierarchical switching device 400 is depicted as including nine external input ports 411a, 412a and 413a, through which packets of data are received, and nine external output ports 411b, 412b and 413b, through which packets are forwarded to a next hop towards their destination in a network (not shown in this figure) to which the hierarchical switching device 400 is connected. The hierarchical switching device 400 also includes a machine readable storage medium 402, a switch controller 401 and a plurality of output queued sub-switches 407-409 connected to each other forming a fully interconnected all-to-all network a. The switch controller 401 may include hardware and software logic to execute instructions, such as the instructions 403-406 stored in the machine-readable storage medium 503. Each sub-switch 407-409 comprises two internal input ports 414a, 415a and 416a, through which packets are received from others sub-switches 407-409, and two internal output ports 414b, 415b and 416b, through which packets are sent to others sub-switches 407-409. In some examples, the hierarchical switching device 400 may comprise a routing table storing all the possible routes within the fully interconnected all-to-all network. In some other examples, the routing table may also store all the possible routes between the hierarchical switching device 400 and the rest of network devices in the network.

The external input ports 411a, 412a and 413a and external output ports 411b, 412b and 413b of the hierarchical switching device 400 are connected to the respective sub-switches 407-409 such that external input ports 411a and external output ports 411b are connected to sub-switch1 407, external input ports 412a and external output ports 412b are connected to sub-switch2 408 and external input ports 413a and external output ports 413b are connected to sub-switch3 409. The external input ports 411a, 412a and 413a have exclusive access to a queue 110b. These queues 110b may be any queue such as circular queues, priority queues, etc. The plurality of sub-switches 407-409 are connected to each other via inter-sub-switch links.

The switch controller 401 allocates to each internal input port 414a, 415a and 416a of the sub-switches 407-409 at 403 a queue partition for each external output port 411b, 412b and 413b of the respective sub-switch 407-409. In such example the switch controller 401 allocates three queue partitions to each internal input port 414a, 415a and 416a such that the internal input ports have exclusive access to the queue portions to which have been allocated. The queue partitions have independent packets flow relative to each other such that each queue partition may be scheduled by itself.

The switch controller 401, in response to reception of a packet at 404 at a first sub-switch of the plurality of sub-switches 407-409, wherein the packet is to be routed to a second sub-switch of the plurality of sub-switches 407-409, routes at 405 the packet between the first sub-switch and the second sub-switch through a minimal path and using an internal output port of the first sub-switch and a queue partition of the second sub-switch that is for the external output port of the second sub-switch to which the packet is to be routed. For example, if the packet is received at an external input port 411a of the sub-switch1 407 and is to be routed to an external output port 413b of the sub-switch3 409, the switch controller 401 may route the packet through a minimal path between sub-switch1 407 and sub-switch 409 and using an internal output port 414b of sub-switch1 407 and a output partition 410a of the sub-switch3 409 that is for the external output port 413b through which the packet is to be routed towards its destination. This minimal path corresponds to the inter-sub-switch link 406x.

In some examples, the switch controller 401 routes the different received packets independently to each other. E.g., different disaggregated portions of the switch controller 401 calculate the corresponding routes for the different received packets and route them towards their external output ports. Other disaggregated portions of the switch controller 401 arbitrate at the output ports of the sub-switches 407-409 the packets received determining the order said packets advance towards their destination.

In some examples, the machine-readable storage medium 402 comprises instructions to select the queue partitions for the external output ports to which the internal input ports have access from a group comprising virtual output queues at the internal input ports of the respective sub-switches and output queues associated to nodes of a fully buffered crossbar fabric of the respective sub-switches.

In some examples, the machine-readable storage medium 402 comprises instructions to allocate to each external input port of a particular sub-switch of the plurality of sub-switches a queue partition for each internal output port of the particular sub-switch.

The switch controller 401 may include hardware and software logic to perform the functionalities described above in relation to instructions 403-405. The machine-readable storage medium 402 may be located either in the computing device executing the machine-readable instructions, or remote from but accessible to the computing device (e.g., via a computer network) for execution.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

The invention claimed is:

1. A hierarchical switching device comprising:
a plurality of sub-switches forming a fully interconnected all-to-all network, wherein a respective sub-switch comprises a plurality of internal input ports and a plurality of internal output ports to exchange packets with other sub-switches within the fully interconnected all-to-all network;
wherein each sub-switch internal input port of the respective sub-switch has exclusive access to a queue partition for each external output port of the respective sub-switch; and
a switch controller to, in response to receipt of a packet at a first sub-switch of the plurality of sub-switches that is to be routed to a particular external output port of a second sub-switch of the plurality of sub-switches, route the packet directly from the first sub-switch to the second sub-switch using an internal output port of the first sub-switch and a queue partition of the second sub-switch that is for the particular external output port.

2. The hierarchical switching device of claim 1, wherein a particular queue partition for a particular external output port of a particular sub-switch has independent packet flow relative to other queue partitions for different external output ports of the particular sub-switch.

3. The hierarchical switching device of claim 1, wherein the queue partitions for the external output ports to which the internal input ports have access are selected from a group comprising virtual output queues at the internal input ports of the respective sub-switches and output queues associated to nodes of a fully buffered crossbar of the respective sub-switches.

4. The hierarchical switching device of claim 1, wherein the switch controller is to monitor a state of the queue partitions to which the internal input ports have exclusive access and to arbitrate which packet from any of the queue partitions is to be routed between the first sub-switch and the second sub-switch based on the state of the queue partitions.

5. The hierarchical switching device of claim 1, wherein external input ports of the sub-switches have exclusive access to a queue partition for each internal output port of the sub-switch.

6. The hierarchical switching device of claim 1, wherein each sub-switch of the plurality of sub-switches comprises a packet scheduler to distribute the packets received in a particular input port among the queue partitions to which the particular input port has exclusive access.

7. The hierarchical switching device of claim 1, wherein the switch controller is located within the switching device and is to receive and route all the packets received at the switching device.

8. The hierarchical switching device of claim 1, wherein each sub-switch of the plurality of sub-switches comprises a respective switch controller that is to receive and route packets received at the corresponding sub-switch.

9. The hierarchical switching device of claim 1, wherein the hierarchical switching device is a multi-die switch.

10. The hierarchical switching device of claim 1, comprising inter-sub-switch links that connect sub-switches to each other, wherein the inter-sub-switch links are links selected among electrical links, optical links and a combination thereof.

11. A method of switching packets in a hierarchical switching device, the hierarchical switching device comprising a plurality of sub-switches forming a fully interconnected all-to-all network and wherein the sub-switches comprise a plurality of internal input ports and a plurality of internal output ports to exchange packets with other sub-switches within the fully interconnected all-to-all network, comprising:
  allocating to each internal input port of a particular sub-switch of the plurality of sub-switches exclusive access to a queue partition for each external output port of the particular sub-switch;
  receiving a packet at an external input port of a first sub-switch of the plurality of sub-switches, wherein the packet is to be routed to a particular external output port of a second sub-switch of the plurality of sub-switches;
  routing, by a switch controller, the packet directly from the external input port of the first sub-switch to the external output port of the second sub-switch using an internal output port of the first sub-switch and a queue partition of the second sub-switch that is for the particular external output port of the second sub-switch.

12. The method of claim 11, comprising implementing, for the different queue partitions for the different external output ports of a particular sub-switch, an independent packet flow relative to each other.

13. The method of claim 11, comprising selecting the queue partitions for the external output ports to which the internal input ports have access from a group comprising virtual output queues at the internal input ports of the respective sub-switches and output queues associated to nodes of a fully buffered crossbar fabric of the respective sub-switches.

14. The method of claim 11, comprising:
  monitoring, by the switch controller, a state of the queue partitions to which the internal input ports have access; and
  arbitrating, by the switch controller, which packet from which of the queue partitions is to be routed between the first sub-switch and the second sub-switch based on the state of the queue partitions.

15. The method of claim 11, allocating to each external input port of a particular sub-switch of the plurality of sub-switches a queue partition for each internal output port of the particular sub-switch.

16. The method of claim 11, comprising distributing, by a packet scheduler, the packets received in a particular input port of a particular sub-switch among the queue partitions associated of the input ports of the particular sub-switch.

17. The method of claim 11, comprising determining, by the switch controller, the external output port of the hierarchical switching device for the packet to be routed towards its destination.

18. A non-transitory machine readable storage medium having stored thereon machine readable instructions to cause a computer processor of a switch controller to:
  allocate to each internal input port of a particular sub-switch of a plurality of sub-switches of a hierarchical switching device exclusive access to a queue partition for each external output port of the particular sub-switch, the queue partitions having independent packets flow relative to each other, and wherein the plurality of sub-switches form a fully interconnected all-to-all network and the sub-switches comprise internal input ports and internal output ports to exchange packets with other sub-switches within the fully interconnected all-to-all network; and
  in response to reception of a packet at a first sub-switch of the plurality of sub-switches that is to be routed to a particular external output port of a second sub-switch of the plurality of sub-switches, route the packet directly from the first sub-switch to the second sub-switch using an internal output port of the first sub-switch and a queue partition of the second sub-switch that is for the particular external output port of the second sub-switch.

19. The non-transitory machine readable storage medium of claim 18, comprising instructions to select the queue partitions for the external output ports to which the internal input ports have access from a group comprising virtual output queues at the internal input ports of the respective sub-switches and output queues associated to nodes of a fully buffered crossbar fabric of the respective sub-switches.

20. The non-transitory machine readable storage medium of claim 18, comprising instructions to allocate to each external input port of a particular sub-switch of the plurality of sub-switches a queue partition for each internal output port of the particular sub-switch.

* * * * *